(12) United States Patent
Matsunaga et al.

(10) Patent No.: US 9,774,062 B2
(45) Date of Patent: Sep. 26, 2017

(54) STORAGE BATTERY, CONTROL METHOD OF STORAGE BATTERY, CONTROL DEVICE, AND CONTROL METHOD

(71) Applicant: NEC Corporation, Minato-ku, Tokyo (JP)

(72) Inventors: Koji Matsunaga, Tokyo (JP); Hiroshi Kajitani, Tokyo (JP); Katsuya Onose, Tokyo (JP)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 14/770,514

(22) PCT Filed: Feb. 26, 2014

(86) PCT No.: PCT/JP2014/054701
§ 371 (c)(1),
(2) Date: Aug. 26, 2015

(87) PCT Pub. No.: WO2014/133009
PCT Pub. Date: Sep. 4, 2014

(65) Prior Publication Data
US 2016/0013521 A1    Jan. 14, 2016

(30) Foreign Application Priority Data
Feb. 27, 2013   (JP) .................................. 2013-037861

(51) Int. Cl.
*H01M 10/44* (2006.01)
*H01M 10/46* (2006.01)
(Continued)

(52) U.S. Cl.
CPC ....... *H01M 10/443* (2013.01); *H01M 10/425* (2013.01); *H01M 10/441* (2013.01);
(Continued)

(58) Field of Classification Search
CPC ...... H02J 7/0021; H02J 7/0047; H02J 7/1423; H02J 7/0013
(Continued)

(56) References Cited

U.S. PATENT DOCUMENTS

2013/0099747 A1*   4/2013   Baba .................... H02J 7/0019
320/118

FOREIGN PATENT DOCUMENTS

JP   2009-043554 A   2/2009
JP   2009-273305 A   11/2009
(Continued)

OTHER PUBLICATIONS

International Search Report for PCT Application No. PCT/JP2014/054701, mailed on May 13, 2014.

*Primary Examiner* — Edward Tso

(57) ABSTRACT

A storage battery (1) including an electric storage unit (10), an auxiliary electric storage unit (11) connected to the electric storage unit (10) in parallel, a temperature measurement unit (13) measuring a temperature, and a charge and discharge control unit (14) controlling charge and discharge of the electric storage unit (10) and the auxiliary electric storage unit (11), in which the charge and discharge control unit (14) changes an SOC (a charge completion SOC) of the electric storage unit (10) and the auxiliary electric storage unit (11) in a charge completion state of not allowing any more charge according to a measurement result of the temperature measurement unit (13), increases the charge completion SOC of the auxiliary electric storage unit (11) when the charge completion SOC of the electric storage unit (10) decreases, and decreases the charge completion SOC of the auxiliary electric storage unit (11) when the charge completion SOC of the electric storage unit (10) increases.

12 Claims, 8 Drawing Sheets

(51) Int. Cl.
*H01M 10/42* (2006.01)
*H01M 10/48* (2006.01)
*H02J 7/00* (2006.01)

(52) U.S. Cl.
CPC ......... *H01M 10/46* (2013.01); *H01M 10/486* (2013.01); *H02J 7/007* (2013.01); *H02J 7/0054* (2013.01); *H02J 7/0075* (2013.01); *H01M 2010/4271* (2013.01)

(58) Field of Classification Search
USPC ................ 320/103, 107, 116, 128, 132, 149
See application file for complete search history.

(56) References Cited

FOREIGN PATENT DOCUMENTS

| | | | |
|---|---|---|---|
| JP | 2010-035280 | A | 2/2010 |
| JP | 2011-030308 | A | 2/2011 |
| WO | 2010/143279 | A1 | 12/2010 |

\* cited by examiner

FIG. 5

| TEMPERATURE RANGE | CHARGE COMPLETION SOC | NUMBER OF ROWS OF SUB-AUXILIARY ELECTRIC STORAGE UNITS |
|---|---|---|
| $-10 < T < 50$ | 100 | 0 |
| $50 \leqq T < 75$ | 90 | 1 |
| $75 \leqq T$ | 80 | 2 |
| $-20 < T \leqq -10$ | 90 | 1 |
| $T \leqq -20$ | 80 | 2 |

STORAGE BATTERY, CONTROL METHOD OF STORAGE BATTERY, CONTROL DEVICE, AND CONTROL METHOD

This application is a National Stage Entry of PCT/JP2014/054701 filed on Feb. 26, 2014, which claims priority from Japanese Patent Application 2013-037861 filed on Feb. 27, 2013, the contents of all of which are incorporated herein by reference, in their entirety.

TECHNICAL FIELD

The present invention relates to a storage battery, a control method of a storage battery, a control device, and a control method.

BACKGROUND ART

When a storage battery such as a lithium ion secondary battery or a lead storage battery is placed in a charge state in a harsh temperature environment, battery capacity deterioration easily progresses. In particular, the battery capacity deterioration is remarkable in a full-charge state where a state of charge (SOC) is 100% (refer to FIGS. 7 and 8). For this reason, it is preferable that the storage battery is used in a mild temperature environment (in a normal temperature environment), for example, approximately from −10° C. to 50° C.

In Patent Document 1, an electric source device including a secondary battery, and a capacitor connected to the secondary battery in parallel is disclosed. The electric source device includes a detection unit detecting a temperature of the capacitor and a voltage of the capacitor, a switching element limiting a discharge current from the capacitor on the basis of a detection value of the detection unit, and a switching element performing at least one of limitation and blocking with respect to the charge current to the capacitor on the basis of the detection value of the detection unit. When the temperature of the capacitor is greater than or equal to a temperature threshold value set in advance (a lower limit of the temperature which is determined as being abnormal), the electric source device capacitor is disconnected. By such control, temperature information and deterioration of the capacitor are suppressed.

In Patent Document 2, a battery pack which is able to reduce possibility that a secondary battery is changed at a temperature unsuitable for the charge and is deteriorated regardless of whether a temperature of the secondary battery is a low temperature or a high temperature is disclosed. The battery pack includes a secondary battery, a connection terminal for receiving a charge current output from a charge unit which outputs the charge current for charging the secondary battery, a temperature detection unit detecting a temperature of the secondary battery, and a charge voltage control unit making the charge voltage of the secondary battery based on the current received by the connection terminal lower than a first voltage set in advance as a voltage for setting the secondary battery to be in constant-voltage charge when the temperature of the secondary battery detected by the temperature detection unit is a second temperature different from a first temperature set in advance as a temperature suitable for the charge of the secondary battery.

RELATED DOCUMENT

Patent Document

[Patent Document 1] Japanese Unexamined Patent Publication No. 2009-273305

[Patent Document 2] Japanese Unexamined Patent Publication No. 2009-43554

DISCLOSURE OF THE INVENTION

The storage battery may be used in a harsh temperature environment. For this reason, a technology suppressing battery capacity deterioration when the storage battery is used in a harsh temperature environment is required.

Therefore, the present inventors have considered a unit which completes (stops) the charge at a low SOC level compared to a case where the storage battery is used in a normal temperature environment when the storage battery is used in a harsh temperature environment, and does not perform the charge until a full-charge state where the SOC is 100%. As described above, the battery capacity deterioration is remarkable in the full-charge state where the SOC is 100% (refer to FIG. 7). According to the technology, the degree of the deterioration is able to be reduced.

However, in a case of the unit described above, when the storage battery is used in a harsh temperature environment, a depth of discharge (DOD) decreases compared to a case where the storage battery is used in a normal temperature environment. According to such a problem, for example, the following disadvantages may occur.

Comparing a charge timing (a state where a charged amount is decreased up to a predetermined level (Example: SOC=10%) after the charge completion, and the charge is required) of a case of using the storage battery in a harsh temperature environment with the charge timing of a case of using the storage battery in a normal temperature environment, the charge timing of the case of using the storage battery in a harsh temperature environment in which the SOC level at the time of stopping the charge is low is faster than the charge timing of the case of using the storage battery in a normal temperature environment. After using the storage battery in a normal temperature environment, the storage battery is used in a harsh temperature environment, and a user who perceives a difference between these charge timings may erroneously assume that the charge timing becomes faster because deterioration of the storage battery progresses. As a result thereof, a disadvantage that even though the storage battery is able to be still used, the storage battery is exchanged with a new storage battery may occur.

An object of the present invention is to provide a new technology suppressing battery capacity deterioration which occurs at the time of using a storage battery in a harsh temperature environment.

According to the present invention, there is provided a storage battery including a first electric storage unit; a second electric storage unit connected to the first electric storage unit in parallel; a temperature measurement unit measuring a temperature; and a charge and discharge control unit controlling charge and discharge of the first electric storage unit and the second electric storage unit, in which the charge and discharge control unit changes a state of charge (SOC) of the first electric storage unit and the second electric storage unit in a charge completion state of not allowing any more charge according to a measurement result of the temperature measurement unit, increases the SOC of the second electric storage unit when the SOC of the first electric storage unit decreases, and decreases the SOC of the second electric storage unit when the SOC of the first electric storage unit increases.

In addition, according to the present invention, there is provided a control method of a storage battery, in which the storage battery includes a first electric storage unit, a second electric storage unit connected to the first electric storage unit in parallel, and a temperature measurement unit measuring a temperature, and an SOC of the first electric storage unit and the second electric storage unit in a charge completion state of not allowing any more charge is changed according to a measurement result of the temperature measurement unit, the SOC of the second electric storage unit increases when the SOC of the first electric storage unit decreases, and the SOC of the second electric storage unit decreases when the SOC of the first electric storage unit increases.

In addition, according to the present invention, there is provided a control device including a charge and discharge control unit controlling charge and discharge of a storage battery which includes a first electric storage unit, a second electric storage unit connected to the first electric storage unit in parallel, and a temperature measurement unit measuring a temperature, in which the charge and discharge control unit changes an SOC of the first electric storage unit and the second electric storage unit in a charge completion state of not allowing any more charge according to a measurement result of the temperature measurement unit, increases the SOC of the second electric storage unit when the SOC of the first electric storage unit decreases, and decreases the SOC of the second electric storage unit when the SOC of the first electric storage unit increases.

In addition, according to the present invention, there is provided a control method including a step of controlling charge and discharge of a storage battery which includes a first electric storage unit, a second electric storage unit connected to the first electric storage unit in parallel, and a temperature measurement unit measuring a temperature, in which in the step, an SOC of the first electric storage unit and the second electric storage unit in a charge completion state of not allowing any more charge is changed according to a measurement result of the temperature measurement unit, the SOC of the second electric storage unit increases when the SOC of the first electric storage unit decreases, and the SOC of the second electric storage unit decreases when the SOC of the first electric storage unit increases.

Furthermore, an operation subject of the control method of a storage battery and the control method described above may be a computer.

According to the present invention, a new technology suppressing battery capacity deterioration which occurs at the time of using a storage battery in a harsh temperature environment is provided.

BRIEF DESCRIPTION OF THE DRAWINGS

The object described above, and other objects, characteristics, and advantages will become more obvious with reference to the following preferred embodiments and the following drawings attached thereto.

FIG. 5 is a diagram illustrating an example of information which is able to be maintained by a charge and discharge control unit of this embodiment.

DESCRIPTION OF EMBODIMENTS

Figure 1:
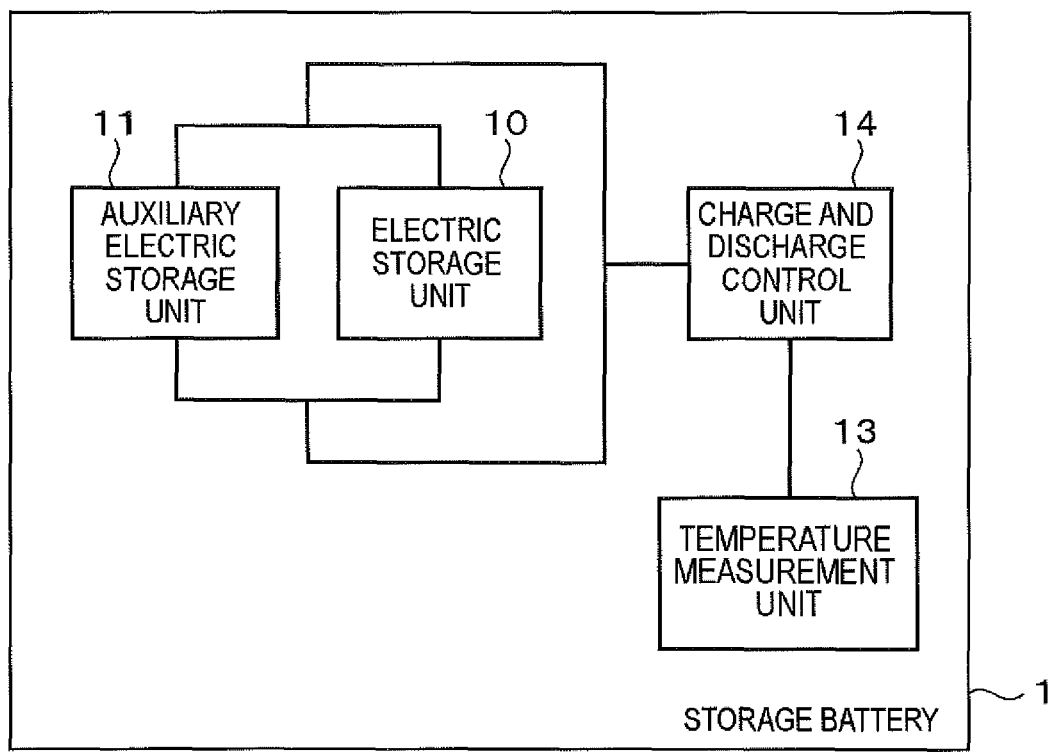
FIG. 1 is an example of a functional block diagram of a storage battery of this embodiment.

Hereinafter, embodiments of the present invention will be described with reference to the drawings. Furthermore, in a plurality of drawings, the same reference numerals are applied to the same constituent parts, and the description thereof will not be repeated.

Furthermore, a system and a device of this embodiment are realized by a CPU of an arbitrary computer, a memory, a program loaded on a memory (including a program downloaded from a memory medium such as a CD or a server or the like on the Internet in addition to a program which is stored in a memory in advance from a shipping stage of the device), a memory unit such as hard disk which stores the program, and an arbitrary combination of hardware and software with a focus on an interface for network connection. Then, a person skilled in the art will understand that a realization method and a device thereof include various modification examples.

In addition, a functional block diagram used for describing this embodiment does not illustrate a configuration of a hardware unit, but a block of a functional unit. In this drawing, it is described that each system and each device are realized by one instrument, but a realization unit thereof is not limited thereto. That is, each system and each device may be configured to be physically divided, or may be configured to be logically divided.

<First Embodiment>

In FIG. 1, an example of a functional block diagram of a storage battery 1 of this embodiment is illustrated. As illustrated, the storage battery 1 includes an electric storage unit (a first electric storage unit) 10, an auxiliary electric storage unit (a second electric storage unit) 11, a temperature measurement unit 13, and a charge and discharge control unit 14. Hereinafter, each unit will be described.

The electric storage unit 10 is configured of one or a plurality of battery cells. The plurality of battery cells configuring the electric storage unit 10 are connected to each other in series and/or in parallel. The electric storage unit 10, for example, is able to be configured of a lithium ion secondary battery or a lead storage battery.

The auxiliary electric storage unit 11 is configured of one or a plurality of battery cells, and is connected to the electric storage unit 10 in parallel. The plurality of battery cells configuring the auxiliary electric storage unit 11 are connected to each other in series and/or in parallel. The auxiliary electric storage unit 11, for example, may be configured of a lithium ion secondary battery or a lead storage battery, or may be a capacitor (an electric double layer capacitor or the like). The configurations of the electric storage unit 10 and the auxiliary electric storage unit 11 (the type of battery, a connection method of the cell, and a capacity) may be identical to each other, or may be different from each other. The capacity of the auxiliary electric storage unit 11 may be less than or equal to the capacity of the electric storage unit 10.

Here, a function of each of the electric storage unit 10 and the auxiliary electric storage unit 11 will be described. The charge and discharge of the storage battery 1 of this embodiment is realized by the electric storage unit 10 and the auxiliary electric storage unit 11, and most of the charge and discharge (at least greater than or equal to half thereof) is realized by the electric storage unit 10. For this reason, it is preferable that the electric storage unit 10 is configured of a lithium ion secondary battery or a lead storage battery by which a large amount of capacity is able to be realized at a comparatively low price. However, the electric storage unit 10 configured of the lithium ion secondary battery or the lead storage battery has low temperature resistance, and thus the battery capacity deterioration as described above may occur.

Therefore, the electric storage unit 10 of this embodiment is controlled by the charge and discharge control unit 14 described later, and a SOC (hereinafter, referred to as a "charge completion SOC") in a charge completion state is changed according to a temperature environment.

Specifically, the charge completion SOC in a case of being in a harsh temperature environment (Example: lower than or equal to −10° C. or higher than or equal to 50° C.) is less than the charge completion SOC in a case of being in a normal temperature environment (Example: higher than −10° C. and lower than 50° C.). According to such a configuration, the deterioration of the electric storage unit 10 in a case where the storage battery 1 is used in a harsh temperature environment is suppressed.

Furthermore, the charge completion state is a state of not allowing (not performing) any more charge with respect to either the charge electric storage unit 10 or the auxiliary electric storage unit 11, and is a state where a user recognizes that a charging rate is 100%. A charged amount in the charge completion state (the sum of a charged amount of the electric storage unit 10 and a charged amount of the auxiliary electric storage unit 11) is less than the sum of the capacity of the electric storage unit 10 and the capacity of the auxiliary electric storage unit 11. That is, in the charge completion state, both of the SOC of the electric storage unit 10 and the SOC of the auxiliary electric storage unit 11 are not 100%.

However, when the charge completion SOC of the electric storage unit 10 in a case of being in a normal temperature environment and the charge completion SOC of the electric storage unit 10 in a case of being in a harsh temperature environment are changed (have different values), as described above, a depth of discharge (DOD) is changed, and a charge timing is changed, and thus various problems may occur.

Therefore, in this embodiment, the charge completion SOC of the auxiliary electric storage unit 11 increases as the charge completion SOC of the electric storage unit 10 becomes smaller. In addition, the charge completion SOC of the auxiliary electric storage unit 11 decreases as the charge completion SOC of the electric storage unit 10 becomes greater. For example, the amount of electric power corresponding to a change in the charge completion SOC of the electric storage unit 10 is able to be approximately coincident with the amount of electric power corresponding to a change in the charge completion SOC of the auxiliary electric storage unit 11. In such a case, regardless of the temperature environment, the sum of the charged amount of the electric storage unit 10 and the charged amount of the auxiliary electric storage unit 11 in the charge completion state is able to be approximately constant. As a result thereof, it is possible to avoid the problems as described above.

The temperature measurement unit 13 measures the temperature of the environment in which the electric storage unit 10 is placed. For example, the temperature measurement unit 13 measures the temperature around the electric storage unit 10.

The charge and discharge control unit 14 controls the charge and discharge of the electric storage unit 10 and the auxiliary electric storage unit 11. That is, the charge and discharge control unit 14 charges each of the electric storage unit 10 and the auxiliary electric storage unit 11 with electric power by using a predetermined charge completion SOC as an upper limit, and discharges the electric power charged in the electric storage unit 10 and the auxiliary electric storage unit 11.

An example of a unit which realizes the charge using a predetermined SOC as a upper limit (the charge up to a predetermined SOC) will be described in the following embodiment, and as the other example, for example, the charge and discharge control unit 14 may be configured such that the SOC of each of the electric storage unit 10 and the auxiliary electric storage unit 11 is able to be measured during the charge. A unit for measuring the SOC is not particularly limited, and any technology of the related art is able to be adopted. Then, the measured SOC may be compared with the charge completion SOC which is set in each of the electric storage unit 10 and the auxiliary electric storage unit 11 at that time point, and thus a timing of completing (stopping) the charge with respect to each of the electric storage unit 10 and the auxiliary electric storage unit 11 may be determined.

Furthermore, the charge and discharge control unit 14 changes the charge completion SOC of the electric storage unit 10 and the auxiliary electric storage unit 11 in the charge completion state according to a measurement result of the temperature measurement unit 13. When the charge and discharge control unit 14 decreases the charge completion SOC of the electric storage unit 10, according to this, the charge and discharge control unit 14 increases the charge completion SOC of the auxiliary electric storage unit 11. In addition, when the charge completion SOC of the electric storage unit 10 increases, according to this, the charge completion SOC of the auxiliary electric storage unit 11 decreases.

For example, when the measurement result of the temperature measurement unit 13 in a range in a normal temperature environment (Example: higher than −10° C. and lower than 50° C.) is substituted by that in a range in a harsh temperature environment (Example: lower than or equal to −10° C. or higher than or equal to 50° C.), the charge and discharge control unit 14 makes the charge completion SOC of the electric storage unit 10 less than the previous charge completion SOC (Example: 100%→90%, and 95%→90%), and makes the charge completion SOC of the auxiliary electric storage unit 11 greater than the previous charge completion SOC (Example: 0%→100%, 0%→50%, and 10%→50%).

In addition, when the measurement result of the temperature measurement unit 13 in the range in a harsh temperature environment (Example: lower than or equal to −10° C. or higher than or equal to 50° C.) is substituted by that in the range in a normal temperature environment (Example: higher than −10° C. and lower than 50° C.), the charge and discharge control unit 14 makes the charge completion SOC of the electric storage unit 10 greater than the previous charge completion SOC (Example: 90%→100%, and 90%→95%), and makes the charge completion SOC of the auxiliary electric storage unit 11 less than the previous charge completion SOC (Example: 100%→0%, 50%→0%, and 50%→5%).

For example, the charge and discharge control unit 14 may maintain information associating the value of the charge completion SOC of the electric storage unit 10 with the value of the charge completion SOC of the auxiliary electric storage unit 11 for each predetermined temperature range, and may control the charge completion SOC by using the information described above. Furthermore, it is possible to set the amount of electric power corresponding to the change in the charge completion SOC of the electric storage unit 10 to be coincident with the amount of electric power corresponding to the change in the charge completion SOC of the auxiliary electric storage unit 11.

However, when the charge completion SOC of the auxiliary electric storage unit 11 is a comparatively high value (90%, 100%, or the like) at the time of setting the measurement result of the temperature measurement unit 13 to be in the range in a harsh temperature environment (Example: lower than or equal to −10° C. or higher than or equal to 50° C.), it is preferable that the auxiliary electric storage unit 11 is configured of a capacitor of which temperature resistance is comparatively strong. When the auxiliary electric storage unit 11 is configured of a lithium ion secondary battery or a lead storage battery of which temperature resistance is comparatively weak, it is preferable that the charge completion SOC of the auxiliary electric storage unit 11 in a harsh temperature environment (Example: lower than or equal to −10° C. or higher than or equal to 50° C.) does not excessively increase by sufficiently increasing the capacity of the auxiliary electric storage unit 11. According to such a configuration, the deterioration of the auxiliary electric storage unit 11 in a case where the storage battery 1 is used in a harsh temperature environment is suppressed.

As described above, according to the storage battery 1 described in this embodiment, it is possible to change the charge completion SOC of the electric storage unit 10 and the auxiliary electric storage unit 11 according to a usage environment of the storage battery. Specifically, it is possible to increase the charge completion SOC of the auxiliary electric storage unit 11 when the charge completion SOC of the electric storage unit 10 decreases, and it is possible to decrease the charge completion SOC of the auxiliary electric storage unit 11 when the charge completion SOC of the electric storage unit 10 increases.

According to such a storage battery 1 of this embodiment, when the storage battery 1 is used in a harsh temperature environment (Example: lower than or equal to −10° C. or higher than or equal to 50° C.), it is possible to decrease the charge completion SOC of the electric storage unit 10 which is configured of a lithium ion secondary battery or a lead storage battery having low temperature resistance. That is, it is possible to prevent the charge completion SOC of the electric storage unit 10 from being 100%, and it is possible to set the charge completion SOC of the electric storage unit 10 to be a small value. As a result thereof, it is possible to suppress the deterioration of the electric storage unit 10.

On the other hand, it is possible to decrease the capacity of the auxiliary electric storage unit 11 compared to that of the electric storage unit 10. For this reason, the auxiliary electric storage unit 11, for example, is able to be configured of a capacitor which has strong temperature resistance. In addition, the auxiliary electric storage unit 11 is able to be configured of a lithium ion secondary battery or a lead storage battery having a capacity to the extent that the charge completion SOC is not 100% at the time of being used in a harsh temperature environment (Example: lower than or equal to −10° C. or higher than or equal to 50° C.). As described above, the capacity of the auxiliary electric storage unit 11 is able to be comparatively small, and when such requisites are satisfied, it is possible to prevent the capacity of the auxiliary electric storage unit 11 from being excessively increased. As a result thereof, even when the charge completion SOC of the auxiliary electric storage unit 11 at the time of being used in a harsh temperature environment (Example: lower than or equal to −10° C. or higher than or equal to 50° C.) increases, the deterioration of the auxiliary electric storage unit 11 is suppressed.

Figure 6:
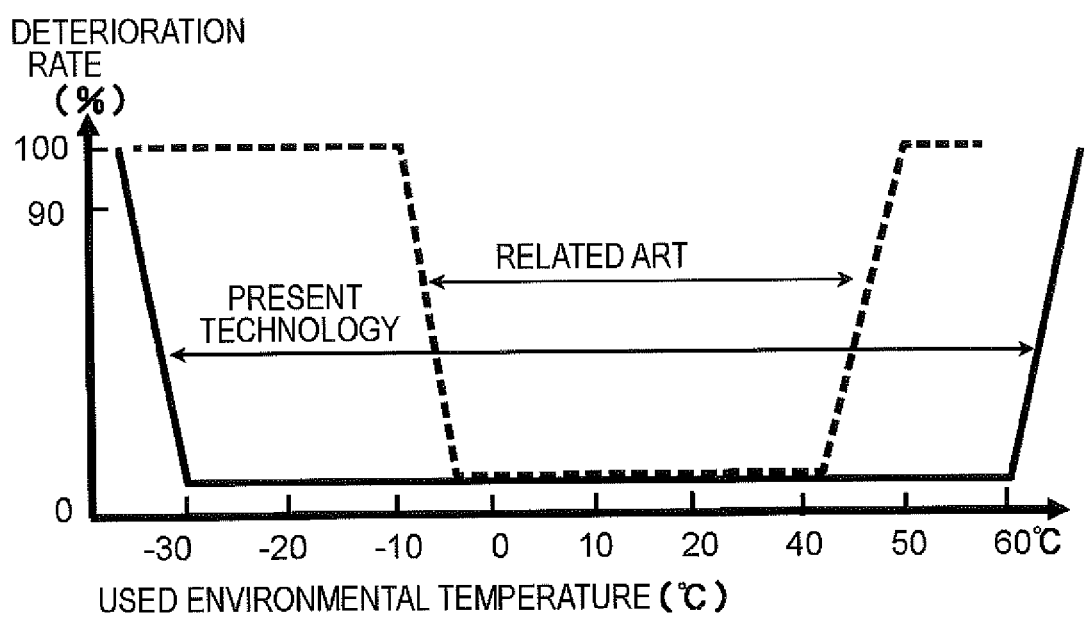
FIG. 6 is a diagram for illustrating a function effect of this embodiment.
Figure 7:
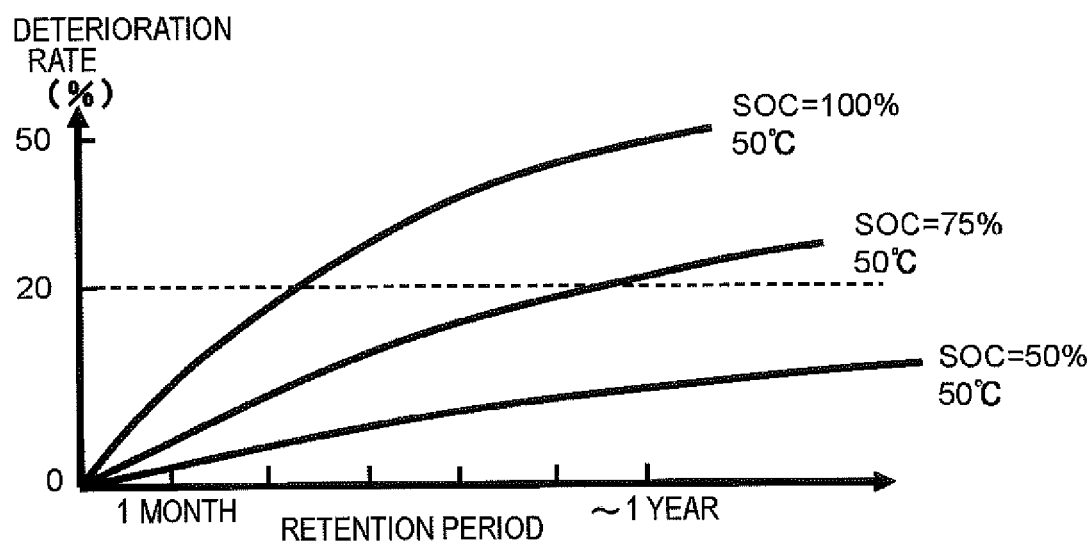
FIG. 7 is a diagram for illustrating an associated technology of this embodiment.
Figure 8:
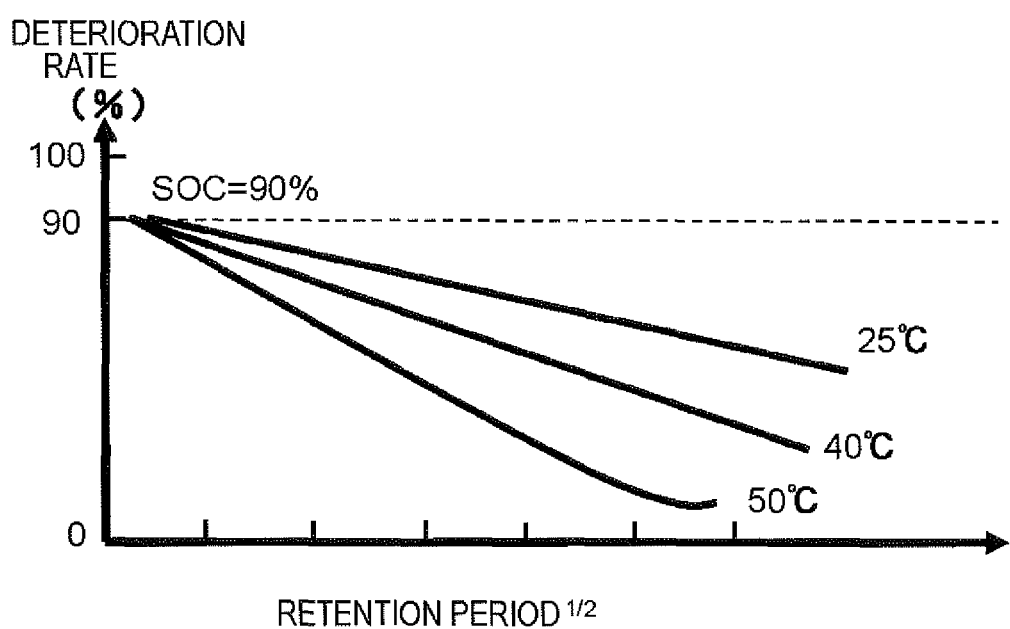
FIG. 8 is a diagram for illustrating an associated technology of this embodiment.

As described above, according to the present invention, as illustrated in FIG. 6, it is possible to use the storage battery 1 while reducing the deterioration in a wider temperature range, compared to the related art.

In addition, according to the storage battery 1 of this embodiment, when the charge completion SOC of the electric storage unit 10 decreases, the charge completion SOC of the auxiliary electric storage unit 11 increases, and the auxiliary electric storage unit 11 is able to be charged with electric power by the reduced amount of electric power. In addition, when the charge completion SOC of the electric storage unit 10 increases, the charge completion SOC of the auxiliary electric storage unit 11 decreases, and the increased amount of electric power is able to be reduced from the charged amount of the auxiliary electric storage unit 11. For this reason, even when the charge completion SOC of the electric storage unit 10 is decreased according to the temperature environment, the charged amount of the entire storage battery 1 is not changed, but is able to be kept approximately constant.

<Second Embodiment>

Figure 2:
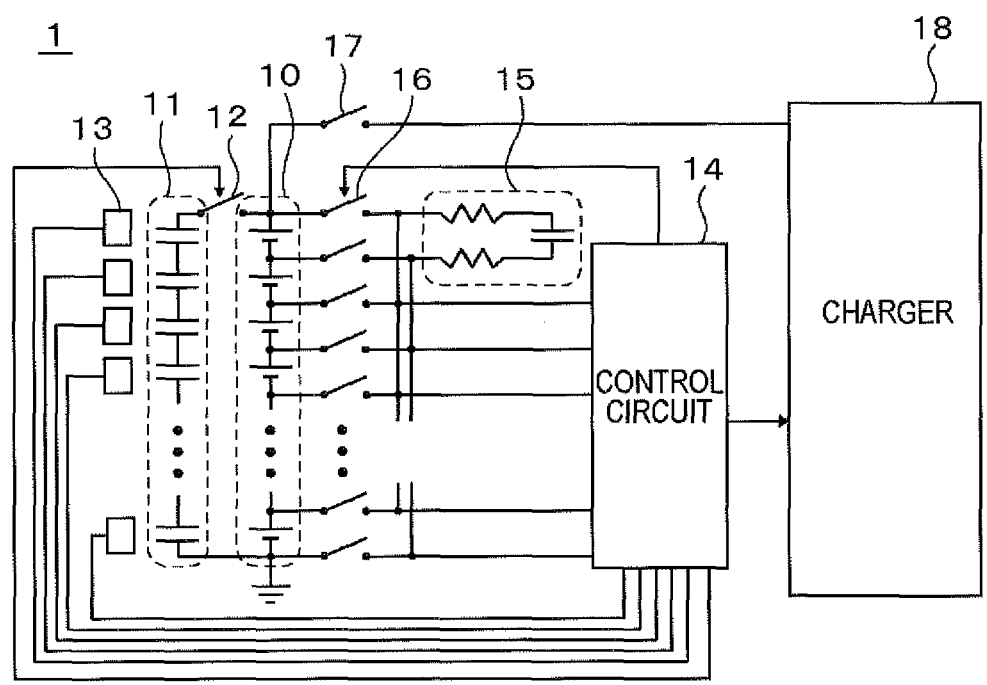
FIG. 2 is a diagram illustrating an example of a configuration of the storage battery of this embodiment.

This embodiment is an embodiment in which the storage battery 1 of the first embodiment is more specified. In FIG. 2, an example of the configuration of the storage battery 1 of this embodiment is illustrated.

As illustrated, the storage battery 1 includes the electric storage unit 10, the auxiliary electric storage unit 11, a switch 12, the temperature measurement unit 13, the charge and discharge control unit (a control circuit) 14, a balance circuit 15, a switch 16, and a switch 17. The storage battery 1 is connected to a charger 18 through an external connection terminal for charge and discharge.

The electric storage unit 10 has a configuration in which a plurality of lithium ion secondary battery cells are connected in series. The energy density of the electric storage unit 10, for example, is able to be greater than or equal to 100 Wh/kg.

The auxiliary electric storage unit 11 has a configuration in which a plurality of capacitor cells (an electric double layer capacitor cell or the like) are connected in series. The energy density of the auxiliary electric storage unit 11, for example, is greater than or equal to 10 Wh/kg. The electric storage unit 10 and the auxiliary electric storage unit 11 are connected in parallel.

The temperature measurement unit 13 includes the same number of temperature sensors as that of the plurality of lithium ion secondary battery cells configuring the electric storage unit 10, and is configured to measure the temperature (an ambient temperature) of each lithium ion secondary battery cell. In the drawing, the temperature sensor is disposed to be closer to the auxiliary electric storage unit 11 than to the electric storage unit 10, but the disposing position of the temperature sensor is not particularly limited insofar as the temperature (the ambient temperature) of the electric storage unit 10 is able to be measured.

Furthermore, the temperature measurement unit 13 may be configured of one temperature sensor, or may be configured of the different number of temperature sensors from that of the lithium ion secondary battery cells.

The balance circuit 15 is used for decreasing a different in the charged amount among the plurality of lithium ion secondary battery cells. Such a balance circuit 15 is able to be realized on the basis of the related art.

The charge and discharge control unit 14 acquires the measurement result from the temperature measurement unit 13, and controls on/off of the switch 12 at the time of the charge and discharge according to the result. In addition, charge and discharge control unit 14 controls on/off of the switch 16 for switching connection between the balance circuit 15 and the electric storage unit 10. In addition, the charge and discharge control unit 14 controls on/off of the switch 17 for switching connection between the charger 18, and the electric storage unit 10 and the auxiliary electric storage unit 11.

Figure 3:
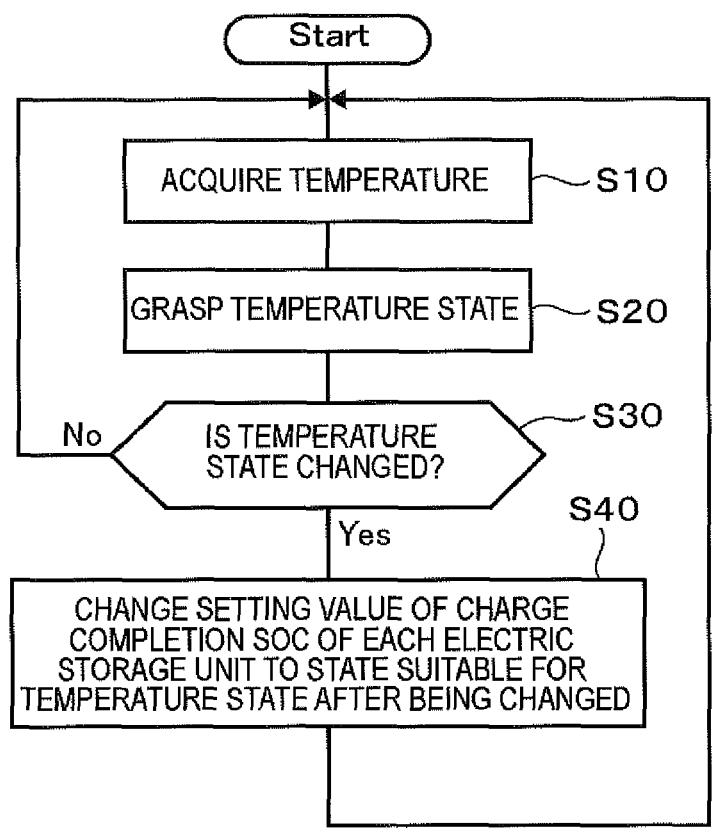
FIG. 3 is a flowchart illustrating an example of a processing flow of the storage battery of this embodiment.

Next, a processing flow of this embodiment will be described with reference to a flowchart of FIG. 3.

The storage battery 1 of this embodiment sets the charge completion SOC of the electric storage unit 10 at the time of being used in a normal temperature environment (a first temperature range. Example: higher than −10° C. and lower than 50° C.) to be 100% and the charge completion SOC of the auxiliary electric storage unit 11 to be 0%, and sets the charge completion SOC of the electric storage unit 10 at the time of being used in a harsh temperature environment (a second temperature range. Example: lower than or equal to −10° C. or higher than or equal to 50° C.) to be P % (0<P<100, an engineering expedient) and the charge completion SOC of the auxiliary electric storage unit 11 to be 100%. That is, the charge completion SOC of the electric storage unit 10 at the time of being used in a normal temperature environment (the first temperature range) is greater than the charge completion SOC of the electric storage unit 10 at the time of being used in a harsh temperature environment (the second temperature range).

The charge and discharge control unit 14 continuously (Example: for each predetermined period of time, or for each predetermined timing) acquires the measurement result from the temperature measurement unit 13, and continues monitoring of whether or not the measurement result (the temperature) is in the range in a normal temperature environment (the first temperature range) or in the range in a harsh temperature environment (the second temperature range), and monitoring of whether or not the temperature environment is changed between these ranges.

Here, the measurement result (the temperature) is in the range in a normal temperature environment (the first temperature range). The charge and discharge control unit 14 sets a setting value of the charge completion SOC of the electric storage unit 10 to be in a suitable state in the temperature environment. Here, the charge completion SOC of the electric storage unit 10 is set to be 100%. In addition, the charge and discharge control unit 14 turns the switch 12 off, and thus the connection between the auxiliary electric storage unit 11 and the external connection terminal for charge and discharge (a terminal connected to the charger 18) is turned off, and then, the charge and discharge is performed by using only the electric storage unit 10. That is, only the electric storage unit 10 is charged at the time of performing electric power charge, and the electric power is taken out only from the electric storage unit 10 at the time of performing electric power discharge.

After that, the charge and discharge control unit 14 continuously (Example: for each predetermined period of time, or a predetermined timing) acquires the measurement result from the temperature measurement unit 13 (S10), and continues monitoring of whether or not the measurement result (the temperature) is in the range in a normal temperature environment (the first temperature range) or in the range in a harsh temperature environment (the second temperature range), and monitoring of whether or not the temperature environment is changed between these ranges (S20).

When the temperature environment (a temperature state) is not changed (No in S30), the process returns to S10, and S10 to S30 are repeated.

In contrast, when the temperature environment (a temperature state) is changed (Yes in S30), the process proceeds to S40. Here, the measurement result (the temperature) is changed from being in the range in a normal temperature environment (the first temperature range) to be in the range in a harsh temperature environment (the second temperature range).

Thus, the charge and discharge control unit 14 changes the setting value of the charge completion SOC of the electric storage unit 10 to be in a suitable state in the temperature environment after being changed. Here, the charge completion SOC of the electric storage unit 10 is changed to be P %. In addition, the charge and discharge control unit 14 turns the switch 12 on, and thus the connection between the auxiliary electric storage unit 11 and the external connection terminal for charge and discharge (the terminal connected to the charger 18) is turned on, and then the charge and discharge is performed by using the electric storage unit 10 and the auxiliary electric storage unit 11. Furthermore, the charge completion SOC of the auxiliary electric storage unit 11 is set to be 100%. That is, when the electric power charge is performed, the electric storage unit 10 is charged with an upper limit in which the SOC is P %, and the auxiliary electric storage unit 11 is charged with an upper limit in which the SOC is 100%. When the electric power discharge is performed, the electric power is taken out from the electric storage unit 10 and the auxiliary electric storage unit 11.

After that, the process returns to S10, and the same processing is continued.

However, as a discharge unit when the storage battery 1 is used in a harsh temperature environment (the second temperature range), the following three units are considered.

As a first unit, a unit which performs the discharge with respect to the auxiliary electric storage unit 11 immediately after the start of the discharge, and after that, performs the discharge with respect to the electric storage unit 10 by using a feature that the capacitor is able to be discharged in a short time compared to a lithium ion secondary battery is considered.

As a second unit, a unit which performs the discharge with respect to the electric storage unit 10 immediately after the start of the discharge, and after that, performs the discharge with respect to the auxiliary electric storage unit 11 is considered. When the storage battery 1 is used in a normal temperature environment (the first temperature range), the charge and discharge is performed by using only the electric storage unit 10 configured of the lithium ion secondary battery, and thus the discharge is performed with respect to the electric storage unit 10 immediately after the start of the discharge. Even when the storage battery 1 is used in a harsh temperature environment (the second temperature range), the discharge is performed with respect to the electric storage unit 10 immediately after the start of the discharge, and thus regardless of the temperature environment, it is possible to perform the same operation immediately after the start of the discharge. As a result thereof, it is possible to avoid a disadvantage of imparting an uncomfortable feeling to the user.

As a third unit, a unit which performs the discharge by taking out the electric power from both of the electric storage unit 10 and the auxiliary electric storage unit 11 is considered. In such a unit, it is possible to decrease a current value of the charge and discharge flowing through the electric storage unit 10, and it is possible to reduce the deterioration of the electric storage unit 10.

According to this embodiment, the same function effect as that of the first embodiment is able to be realized.

In addition, according to the configuration described above, when the storage battery 1 is in a harsh temperature environment (the second temperature range), the switch 12 is turned on, and thus it is possible to make a state in which a charge and discharge current path (I) also flows through a capacitor side (Ic). In general, internal resistance (Rc) of the capacitor is lower than internal resistance (Rb) of the lithium ion secondary battery, and thus a shunt current (Ib) flowing through the lithium ion secondary battery is greater than a shunt current (Ic) flowing through the capacitor unit, but the shunt current (Ib) is able to be less than the charge and discharge current path (I) (refer to the following expression).

$$i_b = \frac{R_c}{R_b} i_c \text{ or } i_b = \frac{1}{1 + \frac{R_c}{R_b}} i, \frac{R_c}{R_b} < 1 \qquad \text{[Expression 1]}$$

Accordingly, in a state where the switch 12 is turned on, the current value of the charge and discharge of the entire storage battery is able to reduce the amount of current of the lithium ion battery unit (the electric storage unit 10), compared to a system which includes a single lithium ion secondary battery having the same capacity. As a result thereof, it is possible to reduce the SOC of the lithium ion secondary battery in a harsh temperature environment (the second temperature range), and it is possible to considerably extend SOH of the lithium ion battery. In such a case, it is possible to widen the temperature environment which is able to be used by the storage battery, and it is possible to considerably increase the durable life of the entire system. Finally, it is possible to considerably reduce the operational cost.

<Third Embodiment>

Figure 4:
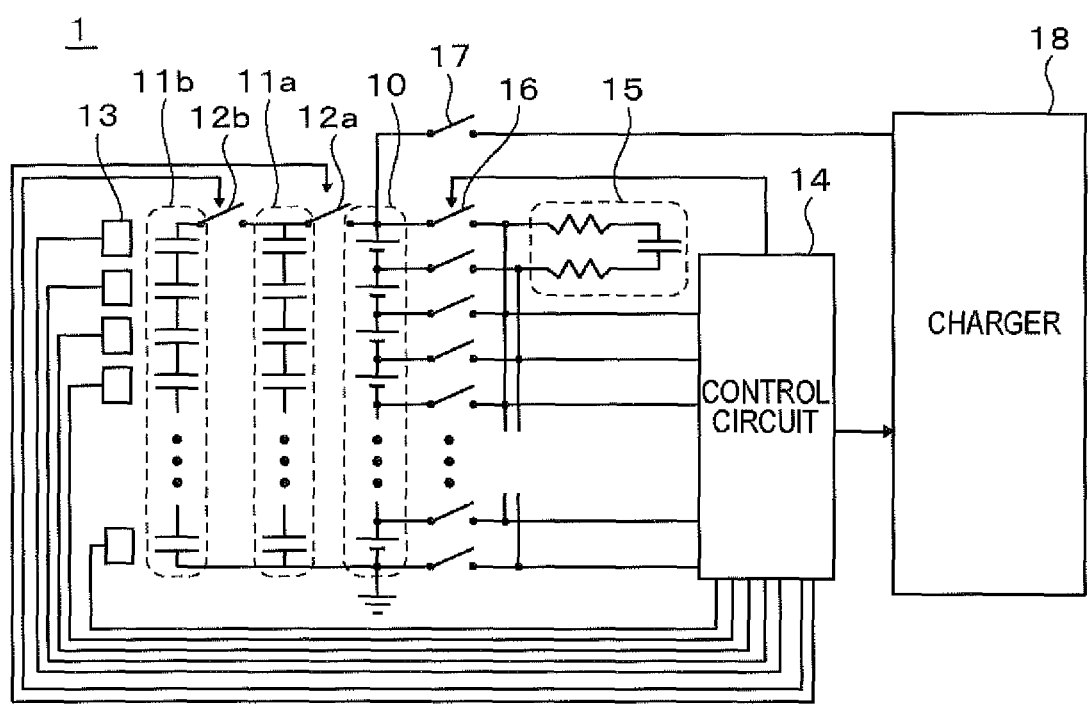
FIG. 4 is a diagram illustrating an example of a configuration of the storage battery of this embodiment.

This embodiment is an embodiment in which the storage battery 1 of the first embodiment is more specified. In FIG. 4, an example of the configuration of the storage battery 1 of this embodiment is illustrated.

As illustrated, the storage battery 1 includes the electric storage unit 10, the auxiliary electric storage unit 11 (sub-auxiliary electric storage units 11a and 11b), switches 12a and 12b, the temperature measurement unit 13, the charge and discharge control unit (the control circuit) 14, the balance circuit 15, the switch 16, and the switch 17. The storage battery 1 is connected to the charger 18.

The electric storage unit 10, the temperature measurement unit 13, the balance circuit 15, the switch 16, and the switch 17 are identical to those of the second embodiment.

The auxiliary electric storage unit 11 includes two rows of the sub-auxiliary electric storage units 11a and 11b. Each of the sub-auxiliary electric storage units 11a and 11b is configured of a plurality of capacitor cells (an electric double layer capacitor cell or the like) connected in series. Then, the plurality of sub-auxiliary electric storage units 11a and 11b are connected to each other in parallel. In addition, the plurality of sub-auxiliary electric storage units 11a and 11b are connected to the electric storage unit 10 in parallel. The plurality of sub-auxiliary electric storage units 11a and 11b is configured to control on/off of each of the switches 12a and 12b, and thus to enable a connection state with respect to the external connection terminal for charge and discharge to be individually controlled. The energy density of each of the sub-auxiliary electric storage units 11a and 11b, for example, is greater than or equal to 10 Wh/kg.

Furthermore, the number of sub-auxiliary electric storage units 11a and 11b may be greater than or equal to three rows. In addition, the configurations of the plurality of sub-auxiliary electric storage units 11a and 11b (the type of battery, a connection method of the cell, and a capacity) may be identical to each other, or may be different from each other.

The charge and discharge control unit 14 acquires the measurement result from the temperature measurement unit 13, and changes the charge completion SOC of the electric storage unit 10 according to the result, and controls on/off of each of the switches 12a and 12b at the time of performing the charge and discharge.

For example, the charge and discharge control unit 14 maintains correspondence information as illustrated in FIG. 5. The illustrated correspondence information is information associating the value of the charge completion SOC of the electric storage unit 10 with the number of rows of the sub-auxiliary electric storage units 11a and 11b which turn on the connection with respect to the external connection terminal for charge and discharge for each predetermined temperature range.

When the charge and discharge control unit 14 acquires the measurement result from the temperature measurement unit 13, the charge completion SOC of the electric storage unit 10 and the number of rows of the sub-auxiliary electric storage units 11a and 11b which turn on the connection with respect to the external connection terminal for charge and discharge are determined with reference to the correspondence information as illustrated in FIG. 5. Then, on/off of each of the switches 12a and 12b is controlled such that the determined number of rows is satisfied.

Furthermore, when the temperature measurement unit 13 includes a plurality of temperature sensors, it is possible to retrieve the correspondence information by using a representative value as a key, and the representative value may be an average value, or may be the worst value (the maximum value).

In an example illustrated in FIG. 5, when the measurement result (a temperature T) of the temperature measurement unit 13 is in a temperature range of $-10<T<50$, the charge and discharge control unit 14 turns off the connection between all of the sub-auxiliary electric storage units 11a and 11b and the external connection terminal for charge and discharge, and performs the charge and discharge by using only the electric storage unit 10. The charge completion SOC of the electric storage unit 10 at this time is 100%.

In addition, when the measurement result (the temperature T) of the temperature measurement unit 13 is in a temperature range of $-20<T\leq-10$ or $50\leq T<75$, the charge and discharge control unit 14 turns on the connection between one row of the sub-auxiliary electric storage unit 11a and the external connection terminal for charge and discharge, and performs the charge and discharge by using the electric storage unit 10 and the one row of the sub-auxiliary electric storage unit 11a. The charge completion SOC of the electric storage unit 10 at this time is 90%, and the charge completion SOC of the sub-auxiliary electric storage unit 11a at this time is 100%. The amount of electric power of 10% of the SOC of the electric storage unit 10 is approximately coincident with the amount of electric power of 100% of the SOC of the sub-auxiliary electric storage unit 11a.

In addition, when the measurement result (the temperature T) of the temperature measurement unit 13 is in a range of T≤−20 or 75≤T, the charge and discharge control unit 14 turns on the connection between two rows of the sub-auxiliary electric storage units 11a and 11b and the external connection terminal for charge and discharge, and performs the charge and discharge by using the electric storage unit 10 and the two rows of the sub-auxiliary electric storage units 11a and 11b. The charge completion SOC of the electric storage unit 10 at this time is 80%, and the charge completion SOC of the sub-auxiliary electric storage units 11a and 11b at this time is 100%. The amount of electric power of 10% of the SOC of the electric storage unit 10 is approximately coincident with the amount of electric power of 100% of the SOC of the sub-auxiliary electric storage unit 11b.

That is, when the temperature is in a third temperature range, the charge and discharge control unit 14 turns off the connection between the auxiliary electric storage unit 11 (all of the sub-auxiliary electric storage units 11a and 11b) and the external connection terminal for charge and discharge, and performs the charge and discharge by using only the electric storage unit 10. In addition, when the temperature is in a fourth temperature range, the charge and discharge control unit 14 turns on the connection between M rows (M is an integer of greater than or equal to 1) of sub-auxiliary electric storage units 11a and 11b and the external connection terminal for charge and discharge, and performs the charge and discharge by using the electric storage unit 10 and the M rows of sub-auxiliary electric storage units 11a and 11b. In addition, when the temperature is in a fifth temperature range, the charge and discharge control unit 14 turns on the connection between N rows (N is an integer of greater than M) of sub-auxiliary electric storage units 11a and 11b and the external connection terminal for charge and discharge, and performs the charge and discharge by using the electric storage unit 10 and the N rows of sub-auxiliary electric storage units 11a and 11b.

Furthermore, the charge completion SOC of the electric storage unit 10 when the temperature is in the third temperature range is greater than the charge completion SOC of the electric storage unit 10 when the temperature is in the fourth temperature range, and the charge completion SOC of the electric storage unit 10 when the temperature is in the fourth temperature range is greater than the charge completion SOC of the electric storage unit 10 when the temperature is in the fifth temperature range.

According to this embodiment, the same function effect as that of the first embodiment and the second embodiment is able to be realized. In addition, it is possible to more precisely change the value of the charge completion SOC of the electric storage unit 10 according to the temperature.

As a modification example of the first embodiment and the second embodiment, a control device including the charge and discharge control unit 14 may be disposed to be separable from the storage battery 1 including the electric storage unit 10, the auxiliary electric storage unit 11, and the temperature measurement unit 13. In this case, the control device may be integrated with the storage battery 1 by being attached to a predetermined position in the storage battery 1.

<<Appendix>>

Hereinafter, an example of a reference aspect will be appended.

1. A storage battery including an electric storage unit configured of one or a plurality of battery cells; an auxiliary electric storage unit configured of one or a plurality of battery cells and connected to the electric storage unit in parallel; a temperature measurement unit measuring a temperature; and a charge and discharge control unit controlling charge and discharge of the electric storage unit and the auxiliary electric storage unit, in which the charge and discharge control unit changes a state of charge (SOC) of the electric storage unit and the auxiliary electric storage unit in a charge completion state of not allowing any more charge according to a measurement result of the temperature measurement unit, increases the SOC of the auxiliary electric storage unit when the SOC of the electric storage unit decreases, and decreases the SOC of the auxiliary electric storage unit when the SOC of the electric storage unit increases.

2. The storage battery according to 1, in which the charge and discharge control unit turns off connection between the auxiliary electric storage unit and an external connection terminal for charge and discharge when the temperature is in a first temperature range, and performs the charge and discharge by using only the electric storage unit, and turns on connection between the auxiliary electric storage unit and the external connection terminal for charge and discharge when the temperature is in a second temperature range, and performs the charge and discharge by using the electric storage unit and the auxiliary electric storage unit.

3. The storage battery according to 2, in which the SOC of the electric storage unit in the charge completion state when the temperature is in the first temperature range is greater than the SOC of the electric storage unit in the charge completion state when the temperature is in the second temperature range.

4. The storage battery according to 1, in which the auxiliary electric storage unit includes a plurality of rows of sub-auxiliary electric storage units which are connected to each other in parallel, and are configured to enable a connection state with respect to an external connection terminal for charge and discharge to be individually controlled.

5. The storage battery according to 4, in which the charge and discharge control unit turns off connection between the auxiliary electric storage unit and the external connection terminal for charge and discharge when the temperature is in a third temperature range, and performs the charge and discharge by using only the electric storage unit, turns on connection between M rows (M is an integer of greater than or equal to 1) of the sub-auxiliary electric storage units and the external connection terminal for charge and discharge when the temperature is in a fourth temperature range, and performs the charge and discharge by using the electric storage unit and the M rows of the sub-auxiliary electric storage units, and turns on connection between N rows (N is an integer of greater than M) of the sub-auxiliary electric storage units and the external connection terminal for charge and discharge when the temperature is in a fifth temperature range, and performs the charge and discharge by using the electric storage unit and the N rows of the sub-auxiliary electric storage units.

6. The storage battery according to 5, in which the SOC of the electric storage unit in the charge completion state when the temperature is in the third temperature range is greater than the SOC of the electric storage unit in the charge completion state when the temperature is in the fourth temperature range, and the SOC of the electric storage unit in the charge completion state when the temperature is in the fourth temperature range is greater than the SOC of the electric storage unit in the charge completion state when the temperature is in the fifth temperature range.

7. The storage battery according to any one of 4 to 6, in which the charge and discharge control unit maintains correspondence information associating a value of the SOC of the electric storage unit in the charge completion state with the number of rows of the sub-auxiliary electric storage unit which turns on the connection with respect to the external connection terminal for charge and discharge for each predetermined temperature range, and controls the charge and discharge of the electric storage unit and the auxiliary electric storage unit by using the correspondence information.

8. The storage battery according to any one of 1 to 7, in which the electric storage unit is a lithium ion secondary battery.

9. The storage battery according to any one of 1 to 8, in which the auxiliary electric storage unit is configured of a capacitor.

10. A control method of a storage battery, in which the storage battery includes an electric storage unit configured of one or a plurality of battery cells, an auxiliary electric storage unit configured of one or a plurality of battery cells and connected to the electric storage unit in parallel, and a temperature measurement unit measuring a temperature, and an SOC of the electric storage unit and the auxiliary electric storage unit in a charge completion state of not allowing any more charge is changed according to a measurement result of the temperature measurement unit, the SOC of the auxiliary electric storage unit increases when the SOC of the electric storage unit decreases, and the SOC of the auxiliary electric storage unit decreases when the SOC of the electric storage unit increases.

10-2. The control method of a storage battery according to 10, in which connection between the auxiliary electric storage unit and an external connection terminal for charge and discharge is turned off when the temperature is in a first temperature range, and the charge and discharge is performed by using only the electric storage unit, and connection between the auxiliary electric storage unit and the external connection terminal for charge and discharge is turned on when the temperature is in a second temperature range, and the charge and discharge is performed by using the electric storage unit and the auxiliary electric storage unit.

10-3. The control method of a storage battery according to 10-2, in which the SOC of the electric storage unit in the charge completion state when the temperature is in the first temperature range is greater than the SOC of the electric storage unit in the charge completion state when the temperature is in the second temperature range.

10-4. The control method of a storage battery according to 10, in which the auxiliary electric storage unit includes a plurality of rows of sub-auxiliary electric storage units which are connected to each other in parallel, and are configured to enable a connection state with respect to an external connection terminal for charge and discharge to be individually controlled.

10-5. The control method of a storage battery according to 10-4, in which connection between the auxiliary electric storage unit and the external connection terminal for charge and discharge is turned off when the temperature is in a third temperature range, and the charge and discharge is performed by using only the electric storage unit, connection between M rows (M is an integer of greater than or equal to 1) of the sub-auxiliary electric storage units and the external connection terminal for charge and discharge is turned on when the temperature is in a fourth temperature range, and the charge and discharge is performed by using the electric storage unit and the M rows of the sub-auxiliary electric storage units, and connection between N rows (N is an integer of greater than M) of the sub-auxiliary electric storage units and the external connection terminal for charge and discharge is turned on when the temperature is in a fifth temperature range, and the charge and discharge is performed by using the electric storage unit and the N rows of the sub-auxiliary electric storage units.

10-6. The control method of a storage battery according to 10-5, in which the SOC of the electric storage unit in the charge completion state when the temperature is in the third temperature range is greater than the SOC of the electric storage unit in the charge completion state when the temperature is in the fourth temperature range, and the SOC of the electric storage unit in the charge completion state when the temperature is in the fourth temperature range is greater than the SOC of the electric storage unit in the charge completion state when the temperature is in the fifth temperature range.

10-7. The control method of a storage battery according to any one of 10-4 to 10-6, in which the electric storage unit maintains correspondence information associating a value of the SOC of the electric storage unit in the charge completion state with the number of rows of the sub-auxiliary electric storage unit which turns on the connection with respect to the external connection terminal for charge and discharge for each predetermined temperature range, and controls the charge and discharge of the electric storage unit and the auxiliary electric storage unit by using the correspondence information.

10-8. The control method of a storage battery according to any one of 10 to 10-7, in which the electric storage unit is a lithium ion secondary battery.

10-9. The control method of a storage battery according to any one of 10 to 10-8, in which the auxiliary electric storage unit is configured of a capacitor.

This application claims priority on the basis of Japanese Patent Application No. 2013-037861, filed on Feb. 27, 2013, and the entire disclosure thereof is incorporated herein.

What is claimed is:

1. A storage battery, comprising:
a first electric storage unit;
a second electric storage unit connected to the first electric storage unit in parallel;
a temperature measurement unit measuring a temperature of the storage battery; and
a charge and discharge control unit controlling charge and discharge of the first electric storage unit and the second electric storage unit,
wherein the charge and discharge control unit:
changes a state of charge (SOC) of the first electric storage unit and the second electric storage unit to a charge completion state in which the first electric storage unit and the second electric storage unit are not permitted to be charged further, according to a measurement result of the temperature measurement unit,
increases the SOC of the second electric storage unit when the SOC of the first electric storage unit decreases and the first electric storage unit and the second electric storage unit are not in the charge completion state, and
decreases the SOC of the second electric storage unit when the SOC of the first electric storage unit increases and the first electric storage unit and the second electric storage unit are not in the charge completion state.

2. The storage battery according to claim 1,
wherein the charge and discharge control unit turns off connection between the second electric storage unit and an external connection terminal for charge and discharge when the temperature is in a first temperature range, and performs the charge and discharge by using only the first electric storage unit, and turns on connection between the second electric storage unit and the external connection terminal for charge and discharge when the temperature is in a second temperature range, and performs the charge and discharge by using the first electric storage unit and the second electric storage unit.

3. The storage battery according to claim 2,
wherein the SOC of the first electric storage unit in the charge completion state when the temperature is in the first temperature range is greater than the SOC of the first electric storage unit in the charge completion state when the temperature is in the second temperature range.

4. The storage battery according to claim 1,
wherein the second electric storage unit includes a plurality of rows of sub-auxiliary electric storage units which are connected to each other in parallel, and are configured to enable a connection state with respect to an external connection terminal for charge and discharge to be individually controlled.

5. The storage battery according to claim 4,
wherein the charge and discharge control unit:
  turns off connection between the second electric storage unit and the external connection terminal for charge and discharge when the temperature is in a third temperature range, and performs the charge and discharge by using only the first electric storage unit;
  turns on connection between M rows (M is an integer of greater than or equal to 1) of the sub-auxiliary electric storage units and the external connection terminal for charge and discharge when the temperature is in a fourth temperature range, and performs the charge and discharge by using the first electric storage unit and the M rows of the sub-auxiliary electric storage units;
  and turns on connection between N rows (N is an integer of greater than M) of the sub-auxiliary electric storage units and the external connection terminal for charge and discharge when the temperature is in a fifth temperature range, and performs the charge and discharge by using the first electric storage unit and the N rows of the sub-auxiliary electric storage units.

6. The storage battery according to claim 5,
wherein the SOC of the first electric storage unit in the charge completion state when the temperature is in the third temperature range is greater than the SOC of the first electric storage unit in the charge completion state when the temperature is in the fourth temperature range, and
the SOC of the first electric storage unit in the charge completion state when the temperature is in the fourth temperature range is greater than the SOC of the first electric storage unit in the charge completion state when the temperature is in the fifth temperature range.

7. The storage battery according to claim 4,
wherein the charge and discharge control unit maintains correspondence information associating a value of the SOC of the first electric storage unit in the charge completion state with the number of rows of the sub-auxiliary electric storage unit which turns on the connection with respect to the external connection terminal for charge and discharge for each predetermined temperature range, and controls the charge and discharge of the first electric storage unit and the second electric storage unit by using the correspondence information.

8. The storage battery according to claim 1,
wherein the first electric storage unit is a lithium ion secondary battery.

9. The storage battery according to claim 1,
wherein the second electric storage unit is configured of a capacitor.

10. A control method of a storage battery, comprising:
measuring a temperature of the storage battery;
based on the measured temperature of the storage battery, changing a state of charge of a first electric storage unit and a second electric storage unit of the storage battery connected in parallel to one another to a charge completion state in which the first electric storage unit and the second electric storage unit are not permitted to be charged further;
monitoring charge and discharge of each of the first electric storage unit and the second electric storage unit;
when the first electric storage unit and the second electric storage unit are not in the charge completion state, and the monitored charge of the first electric storage unit has decreased, increasing charge of the second electric storage unit; and
when the first electric storage unit and the second electric storage unit are not in the charge completion state, and the monitored charge of the second electric storage unit has decreased, increasing charge of the first electric storage unit.

11. A control device, comprising:
a charge and discharge control unit controlling charge and discharge of a storage battery which includes a first electric storage unit, a second electric storage unit connected to the first electric storage unit in parallel, and a temperature measurement unit measuring a temperature of the storage battery,
wherein the charge and discharge control unit:
  changes a state of charge (SOC) of the first electric storage unit and the second electric storage unit to a charge completion state in which the first electric storage unit and the second electric storage unit are not permitted to be charged further, according to a measurement result of the temperature measurement unit,
  increases the SOC of the second electric storage unit when the SOC of the first electric storage unit decreases and the first electric storage unit and the second electric storage unit are not in the charge completion state, and
  decreases the SOC of the second electric storage unit when the SOC of the first electric storage unit increases and the first electric storage unit and the second electric storage unit are not in the charge completion state.

12. A control method, comprising:
a step of controlling charge and discharge of a storage battery which includes a first electric storage unit, a second electric storage unit connected to the first electric storage unit in parallel, and a temperature measurement unit measuring a temperature of the storage battery, wherein the step of controlling the charge and the discharge of the storage battery:
- changes a state of charge (SOC) of the first electric storage unit and the second electric storage unit to a charge completion state in which the first electric storage unit and the second electric storage unit are not permitted to be charged further, according to a measurement result of the temperature measurement unit,
- increases the SOC of the second electric storage unit when the SOC of the first electric storage unit decreases and the first electric storage unit and the second electric storage unit are not in the charge completion state, and
- decreases the SOC of the second electric storage unit when the SOC of the first electric storage unit increases and the first electric storage unit and the second electric storage unit are not in the charge completion state.

* * * * *